United States Patent [19]

Halila

[11] Patent Number: 5,279,112
[45] Date of Patent: Jan. 18, 1994

[54] FUEL LINE FITTING

[75] Inventor: Ely E. Halila, Cincinnati, Ohio

[73] Assignee: General Electric Company, Cincinnati, Ohio

[21] Appl. No.: 836,494

[22] Filed: Feb. 18, 1992

[51] Int. Cl.⁵ .............................................. F02G 3/00
[52] U.S. Cl. ................................. 60/39.094; 285/13; 285/133.1
[58] Field of Search ...................... 60/734, 739, 39.31, 60/39.094; 285/386, 354, 353, 133.1, 13

[56] References Cited

U.S. PATENT DOCUMENTS

| | | | |
|---|---|---|---|
| 3,285,627 | 11/1966 | Kozulla et al. | 285/353 |
| 3,891,251 | 6/1975 | Richter, Jr. | 285/12 |
| 4,185,462 | 1/1980 | Morse, II et al. | 60/39.31 |
| 4,467,462 | 8/1984 | Pearson et al. | 285/13 |
| 4,570,981 | 2/1986 | Fournier et al. | 285/354 |
| 4,930,549 | 6/1990 | Renner | 285/13 |

FOREIGN PATENT DOCUMENTS

| | | | |
|---|---|---|---|
| 0000381 | of 1908 | United Kingdom | 285/13 |
| 2107809 | 5/1983 | United Kingdom | 285/13 |

*Primary Examiner*—Richard A. Bertsch
*Assistant Examiner*—Timothy S. Thorpe
*Attorney, Agent, or Firm*—Jerome C. Squillaro

[57] ABSTRACT

To connect an external fuel line to an internal fuel line feeding an internal fuel manifold in a combustor of a gas turbine engine, a fitting includes a first joint half terminating the internal fuel line and a second joint half terminating the external fuel line; the joint halves being united to provide a threaded fluid joint. The first joint half is integrally formed with a cup-shaped reservoir containing the fluid joint and having an outwardly turned brim which is affixed to a combustor casing in surrounding relation to a casing hole. The reservoir thus serves to shunt mechanical loadings from the fluid joint and to collect any fuel leakage therefrom.

14 Claims, 4 Drawing Sheets

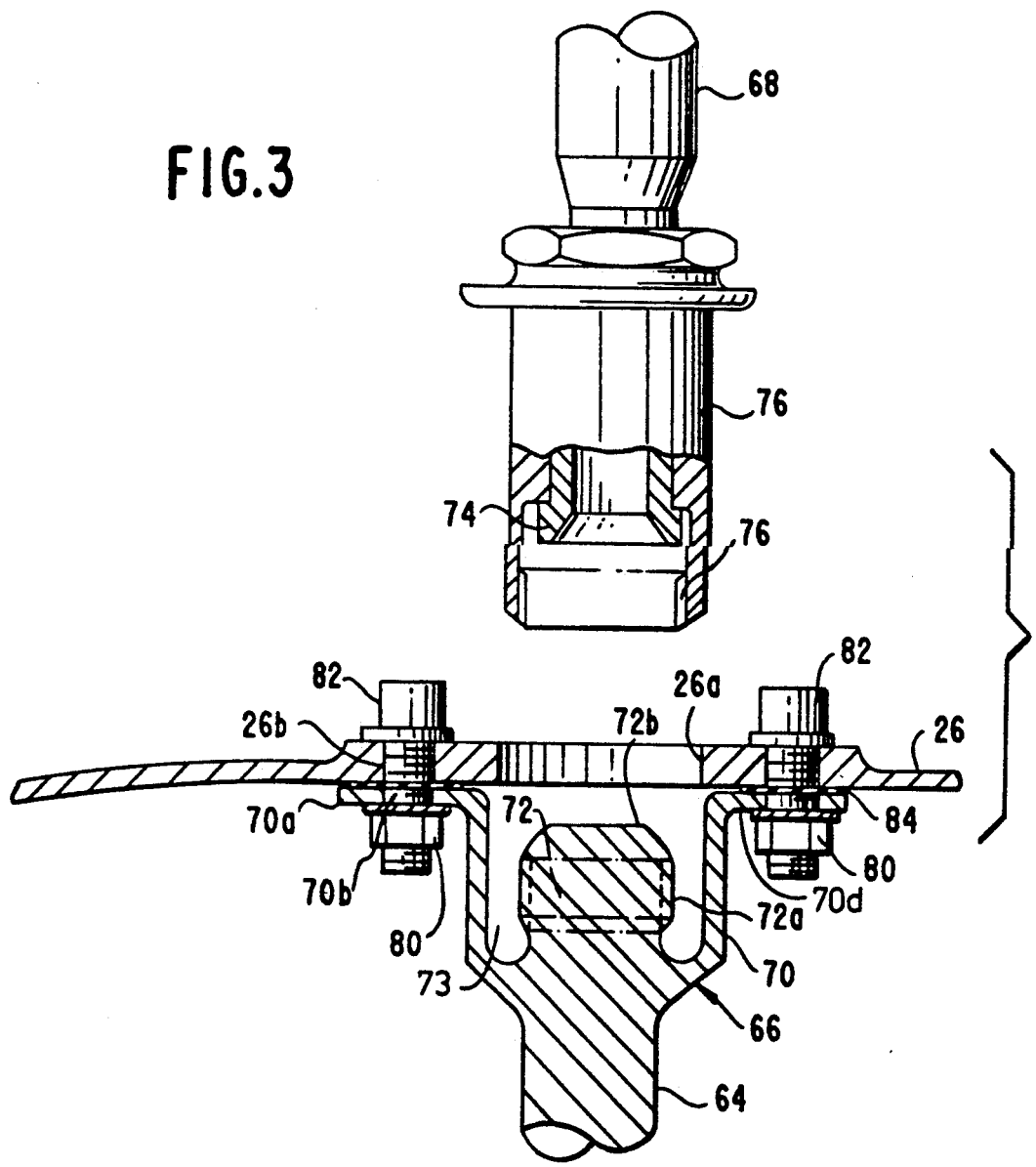

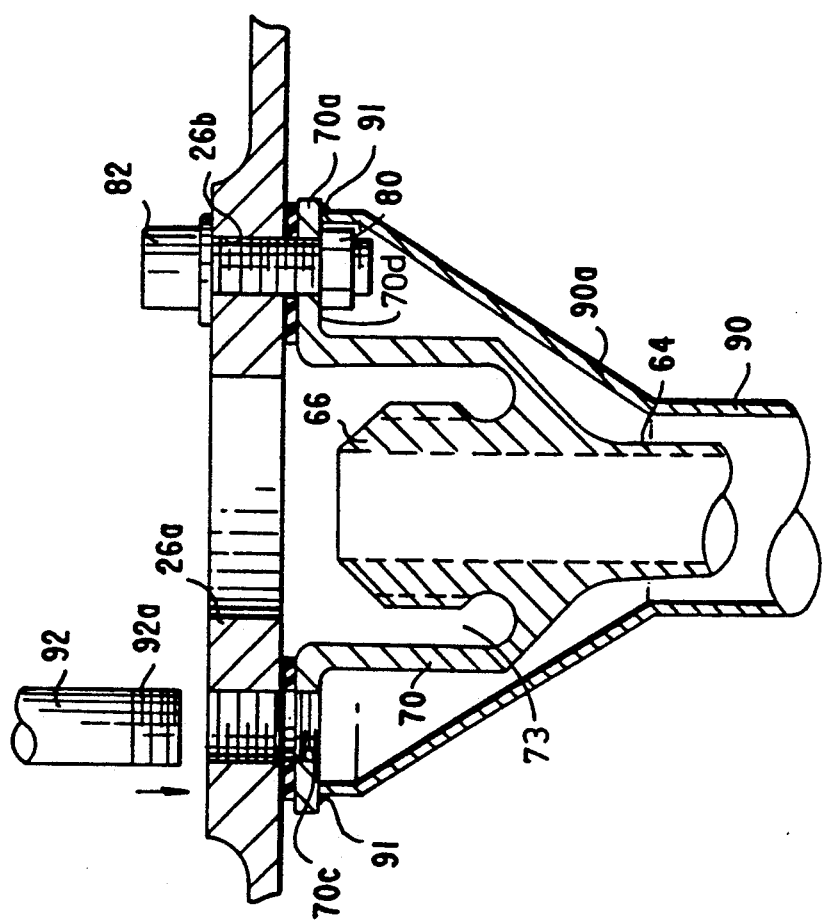

FUEL LINE FITTING

The present invention relates generally to fluid delivery apparatuses and particularly to the conveyance of fuel to fuel manifolds mounted within a combustor in a gas turbine engine.

BACKGROUND OF THE INVENTION

Conventional gas turbine engines include an annular combustor having a plurality of circumferentially spaced carburetors disposed in one and sometimes two domes positioned at the upstream end of the combustor. The combustor is mounted within an annular combustor casing and receives high temperature, high pressure air discharged by a compressor for mixture with fuel delivered by the carburetors and then ignited.

Typically, the fuel manifolds are mounted circumferentially about the exterior of the combustor casing with fuel stems penetrating the casing to convey fuel to the fuel injectors of the carburetors. The fuel manifolds feeding the individual fuel stems are necessarily large to accommodate their virtual 360° extension about the casing periphery. Consequently, engine weight is increased due to the large diameter manifolds and elongated fuel stems. Additionally, the extensions of the fuel stems within the engine cause aerodynamic pressure drops as air flows through the outer liner passageway past the fuel stems.

To avoid these penalties, it has been proposed, as disclosed in the commonly assigned MacLean et al. pending application entitled "Gas Turbine Engine Fuel Manifold", Ser. No. 07/891,925 which is a continuation of Ser. No. 07/642,780, filed Jan. 18, 1991, to mount the fuel manifolds internally of the combustor casing. Aside from the high temperature problems addressed by this copending application, there are other important considerations such as the mounting of the internal fuel manifolds, the attendant mis-matches in thermal growths, the reliability of the fluid couplings in the manifold feed lines, and the potential for fuel leaks and spillage which could lead to engine fires.

SUMMARY OF THE INVENTION

It is accordingly an objective of the present invention to provide an improved structural attachment or fitting for inclusion in a fluid line which incorporates both a fluid coupling and mounting provision for supporting a fluid utilization device in its operating environment. The mounting provision is uniquely structured to bypass all device supporting loads, as well as vibratory and aerodynamic loadings, from the fluid coupling. The integrity of the fluid joint is therefore preserved. The mounting provision is also structured to contain any fluid leaks that may occur. With these attributes, the fitting of the present invention has particular application in fuel lines feeding fuel manifolds stationed internally of a combustor in a gas turbine engine.

To these ends, in its application to gas turbine engines, the fitting of the present invention is utilized as a termination for internal fuel lines feeding a fuel manifold positioned internally of a combustor. The fitting includes a threaded joint half encompassed by an integral, cup-shaped reservoir having an outwardly turned brim to serve as a mounting flange for affixation to the inner side of a combustor casing in surrounding relation to a casing opening. An external fuel line is terminated by a joint half which threadedly engages the internal fuel line joint half to complete a fluid-tight coupling. The reservoir diverts all mechanical loadings on the manifold from the fluid coupling directly to the combustor casing, thus bypassing the threaded joint connection, and the reservoir collects any fuel joint leakage to prevent spillage into the combustor.

In an alternative embodiment of the invention, the internal fuel line is provided with a coaxial, spaced outer tube which is terminated at the reservoir brim in a fluid-tight joint. Any fuel spillage due to ruptures in the internal fuel line is collected in the annular space between the internal fuel line and the outer tube. A drain line communicating with this collection space is connected into the fitting to carry away any spillage for safe disposal.

The invention accordingly comprises the features of constructions, arrangements of parts and combinations of elements, all as detailed hereinafter, and the scope of the invention will be indicated in the claims.

BRIEF DESCRIPTION OF THE DRAWINGS

For a full understanding of the nature and objectives of the present invention, reference may be had to the following Detailed Description taken in conjunction with the accompanying drawings, in which:

FIG. 3 is an enlarged sectional view of one embodiment of a fuel line fitting utilized to feed the fuel manifolds of FIG. 2; and FIG. 4 is an enlarged sectional view of an alternative fuel line fitting embodiment of the present invention.

Corresponding reference numerals refer to like parts throughout the several views of the drawings.

DETAILED DESCRIPTION

Figure 1:
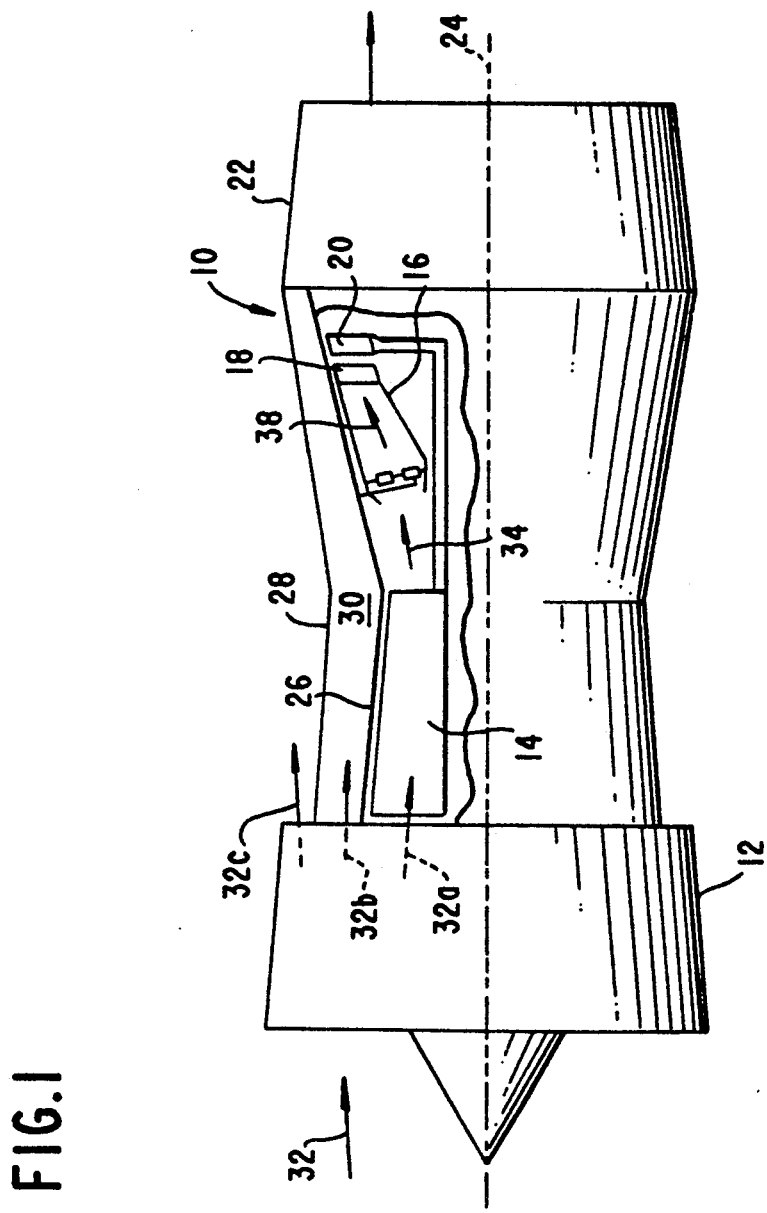
FIG. 1 is a longitudinal sectional view, in schematic form, of a gas turbine engine to which the fuel line fitting of the present invention is applicable.

A conventional high bypass turbofan gas turbine engine, generally indicated at 10 in FIG. 1, includes a fan 12, a compressor 14, a combustor 16, a high pressure turbine nozzle 18, a high pressure turbine rotor 20 and a low pressure turbine 22 coaxially disposed in serial fluid flow relation coaxially about an engine axial centerline 24.

Compressor 14 and combustor 16 are disposed within an annular casing 26, and in this exemplary embodiment of engine 10, an annular outer casing 28 surrounds casing 26 to define an annular bypass duct 30. In conventional operation, ambient air 32 is channeled through fan 12, a first portion 32a of which is channeled into compressor 14, a second portion 32b is channeled through bypass duct 30, and a third portion 32c is discharged from the fan over the outer casing 28, providing thrust to propel an aircraft in flight. The first air portion 32a is compressed in the compressor 14 to provide relatively hot compressor discharge air 34 which is channeled to the combustor where it is mixed with fuel and ignited to generate combustion discharge gases 38 which flow through nozzle 18, and turbines 20 and 22 for powering the compressor 14 and fan 12, respectively.

Figure 2:
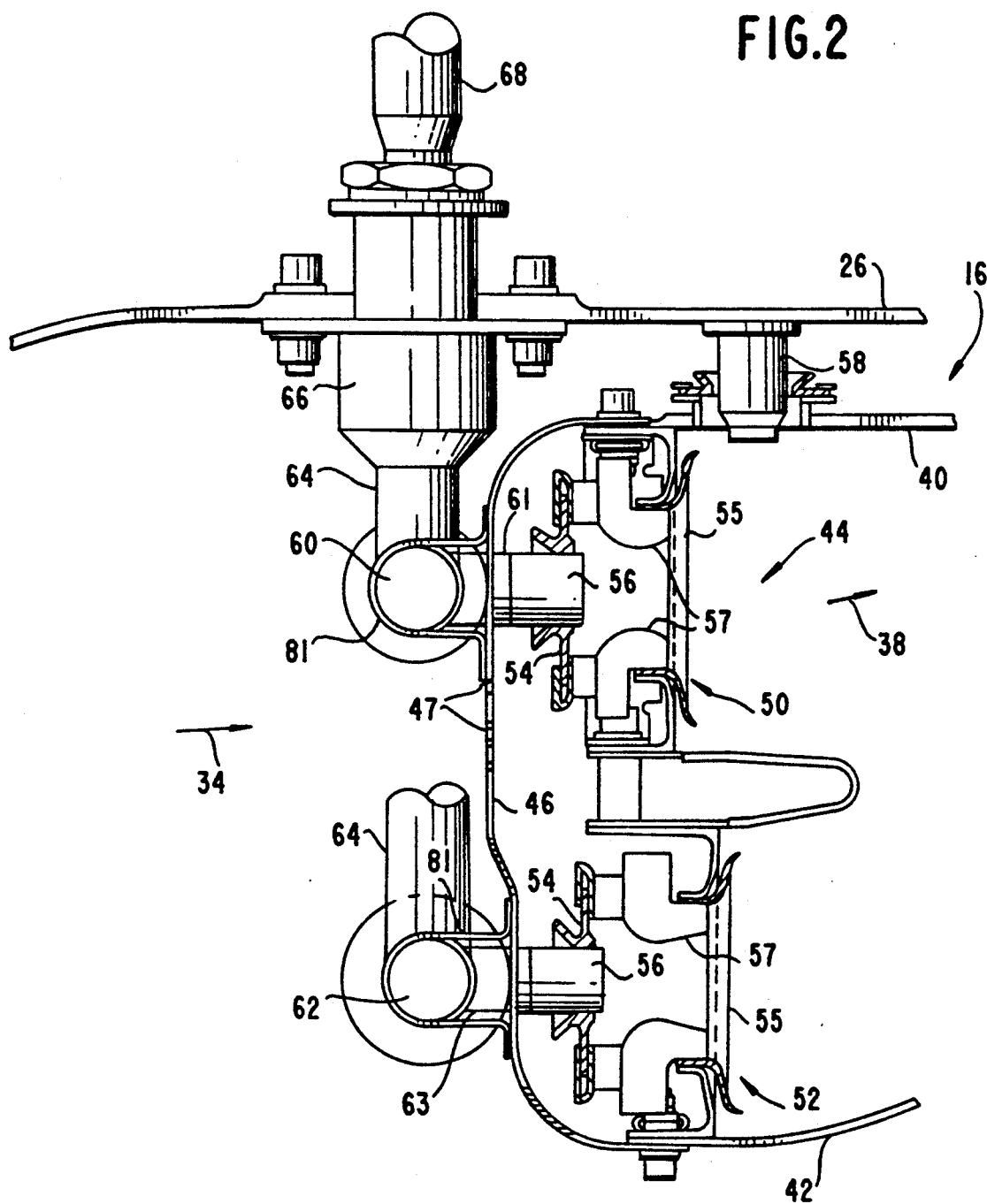
FIG. 2 is an enlarged longitudinal sectional view of the combustor region of the engine in FIG. 1 illustrating the application thereto of fuel line fittings constructed in accordance with the present invention.

As illustrated in greater detail in FIG. 2, combustor 16 includes an annular outer liner 40 and an annular inner liner 42 radially inwardly of casing 26. These liners are joined at their upstream ends to an annular dome, generally indicated at 44. An annular cowl 46 extends upstream from the dome 44 and is perforated, as indicated at 47, to admit compressor discharge air 34 to combustor dome 44.

In the illustrated combustor 16, the dome 44 is a double dome comprising a set of circumferentially spaced outer carburetors, generally indicated at 50, and a set of circumferentially spaced inner carburetors, generally indicated at 52. Each of the carburetors includes an air swirler 54, a splash plate 55, a fuel injector 56, and a venture 57. Fuel is discharged from the fuel injectors 56 and mixed with the compressor discharge air 34 in the swirlers 54 to create a fuel/air mixture which is initially ignited by an ignitor 58 to create combustion gases 38.

Still referring to FIG. 2, fuel injectors 56 of the radially outer set of carburetors 50 are fed from an annular outer fuel manifold 60 via stems 61, while the fuel injectors of the radially inner set of carburetors 52 are fed from an annular inner fuel manifold 62 via stems 63. These fuel manifolds receive fuel through internal fuel lines 64 which are terminated with fittings, generally indicated at 66. As seen in the embodiment of the present invention illustrated in FIG. 3, these fittings are constructed to provide fluid-tight couplings of the internal fuel lines with external fuel lines 68 and to accommodate mounting attachment to casing 26. To these ends, fittings 66 are provided with a cup-shaped reservoir 70 integrally formed in surrounding relation with a joint half in the form of a threaded nipple 72. The external fuel lines are terminated with a nipple seat 74 and a captive sleeve nut 76. A conventional fluid joint can thus be perfected by threading nut 76 onto the nipple threads 72a to clamp the conical nipple tip 72b in surface engagement with a conforming conical surface of nipple seat 74.

Heretofore, these fluid couplings were also relied upon to support the fuel manifolds in their positions relative to the combustor dome. Thus, these fluid couplings were directly subjected to the loading imposed by the manifold weight, as well as vibrational and aerodynamic loadings encountered during engine operation. The resulting stresses on the threaded joint of the couplings can eventually lead to cracks in these threaded joints, resulting in fuel leakage from the couplings and consequent engine fires at sites upstream from the combustor dome and cowl and even in bypass duct 30 (FIG. 1) beyond combustor casing 26.

In accordance with the present invention, the addition of reservoir 70 serves as means for attaching fittings 66 to combustor casing 26 about casing holes 26a admitting the external fuel lines 68 and also provides a cavity 73 for collecting any fuel leakage from the coupling. Thus, the reservoirs are provided with an outwardly turned, annular brim 70a in which are bored a plurality of circumferentially spaced bolt holes 70b. A captive nut 80 is positioned against the underside 70d of the brim in concentric relation with each bolt hole. With an annular gasket 84 positioned between the brim and combustor casing, bolts 82 are inserted through bolt holes 26b in the casing and bolt holes 70b in the reservoir brim and thread into nuts 80 to clamp the fittings in fluid-tight engagement with the casing. It is seen that the fluid couplings and the fitting attachment to the combustor casing can be made from the outer side of the combustor casing, thus facilitating assembly. Also, the attachment bolts 82 serve an anti-torque function when sleeve nut 76 is wrenched tight to perfect the threaded fuel joint.

It is seen that, by virtue of the fitting construction afforded by the present invention, all loadings introduced by the fuel manifolds and attached fuel lines, stems and fuel injectors are diverted or bypassed from the fluid joints directly to the combustor casing 26 via reservoirs 70. The integrity of the fluid couplings is thus dramatically enhanced. On the remote chance that coupling leakage should occur, it is collected in the reservoirs in isolated relation to the combustor. Any such fuel leakage spills out of the reservoir through the annular gap between the sleeve nut 76 and casing opening 26a externally of the combustor. The potential of engine fires is thus minimized. To assist the fittings in their support function, the manifold may be attached to the cowl by brackets 81 seen in FIG. 2.

In the alternative embodiment of the invention seen in FIG. 4, provisions are also made to safely handle fuel spillage resulting from ruptures in the internal fuel lines. To this end, an outer tube 90 is provided in coaxial, spaced relation with internal fuel line 64 and fitting 66. This outer tube is provided with a flared termination 90a conforming to the profile of fitting 66 so as to accommodate attachment to the underside 70d of the reservoir brim 70a just inside of its annular terminal edge via a continuous butt weld, as indicated at 91. To handle any spillage collected in concentric outer tube 90, a drain line 92 is inserted through one of the bolt holes in casing 26 and its threaded end 92a is engaged in the aligned, threaded bolthole 70c in reservoir brim 70a to perfect a fluid joint. Drain line 92 thus communicates with the annular space between the outer tube and the internal fuel line to carry away any fuel spillage collected therein.

While the fitting of the present invention has been disclosed in its application serving internal fuel manifolds of a gas turbine engine, it will be appreciated that the fitting can be utilized in a fuel line feeding a burner of an augmentor or afterburner of a gas turbine engine. Moreover, the fitting has utility in a variety of fluid handling applications where mechanical loadings can jeopardize the integrity of fluid couplings.

It is seen from the foregoing that the objectives of the present invention have been efficiently attained, and, since certain changes may be made in the constructions set forth without departing from the scope of the present invention, it is intended that matters of detail be taken as illustrative and not in a limiting sense.

Having described the invention, what is claimed as new and desired to secure by Letter Patent is:

1. A fluid fitting for completing a fluid coupling between first and second fluid lines adjacent an opening in a support structure, said fluid fitting comprising, in combination:

A. a first, threaded fluid joint half terminating said first fluid line;

B. a second, threaded fluid joint half terminating said second fluid line for engaging said first fluid joint half to provide a threaded fluid coupling between said first and second fluid lines; and C. a cup-shaped reservoir joined in fluid sealing relation with said first joint half and comprising a cavity which is external to each of said first and second fluid lines and which surrounds said fluid coupling to collect any leakage from said fluid coupling, said reservoir having an outwardly turned annular brim serving as a mounting flange for affixture to the support structure in surrounding relation with the opening therein.

2. The fluid fitting defined in claim 1, wherein said reservoir is integrally formed with said first half.

3. The fluid fitting defined in claim 2, wherein said brim is affixed to the support structure by plural bolt fasteners, wherein all loadings introduced by said first and second fluid lines are bypassed from said threaded fluid coupling to said support structure.

4. The fluid fitting defined in claim 2, which further includes a tube surrounding said first fluid line and said reservoir and having a termination joined with said brim in fluid-tight relation, wherein said termination of said tube is fixedly attached to an underside of said brim, said underside facing away from said support structure.

5. The fluid fitting defined in claim 4, wherein said brim is formed having a plurality of angularly spaced boltholes in registry with correspondingly spaced boltholes in the support structure for receiving bolts inserted from the side of the support structure from which said second fluid line extends, at least one of said brim boltholes being threaded to engage a threaded end of a drain line communicating with the annular space between said tube and said reservoir and first fluid line.

6. A fluid fitting for completing a fluid coupling between first and second fluid lines adjacent an opening in a support structure, said fluid fitting comprising, in combination:
   A. a first, threaded fluid joint half terminating said first fluid line;
   B. a second, threaded fluid joint half terminating said second fluid line for engaging said first fluid joint half to provide a threaded fluid coupling between said first and second fluid lines; and
   C. a cup-shaped reservoir joined in fluid sealing relation with said first joint half to collect any leakage from said fluid coupling, said reservoir having an outwardly turned annular brim serving as a mounting flange for affixture to the support structure in surrounding relation with the opening therein;
   D. wherein said reservoir is integrally formed with said first half; and
   E. wherein said first joint half is in the form of a nipple having external threads, and said second joint half is in the form of a nipple seat, and a sleeve nut for engaging said nipple threads to clamp said nipple and nipple seat in fluid-tight engagement to perfect said fluid coupling.

7. The fluid fitting defined in claim 6, wherein said brim is formed having a plurality of angularly spaced boltholes in registry with correspondingly spaced boltholes in the support structure for receiving bolts inserted from the side of the support structure from which said second fluid line extends.

8. A fuel fitting for completing a fluid coupling between internal and external fuel lines adjacent an opening in a casing surrounding a combustor of a gas turbine engine, said internal fuel line having a first end connected with an internal fuel manifold for the combustor, said fuel fitting comprising in combination:
   A. a first, threaded fluid joint half terminating a second end of said internal fuel line;
   B. a second, threaded fluid joint half terminating an end of said external fuel line for engaging said first fluid joint half to provide a threaded fluid coupling between said internal and external fuel lines; and
   C. a cup-shaped reservoir joined in fluid sealing relation with said first joint half and comprising a cavity which is radially outward of said internal fuel line and said external fuel line and which surrounds said fluid coupling to collect any fuel leakage from said fluid coupling, said reservoir having an outwardly turned annular brim serving as a mounting flange for affixture to the casing in surrounding relation with the opening therein.

9. The fluid fitting defined in claim 8, wherein said reservoir is integrally formed with said first half.

10. The fluid fitting defined in claim 9, wherein said brim is affixed to the support structure by plural bolt fasteners, wherein all loadings introduced by said internal fuel manifold and said internal and external fuel lines are bypassed from said threaded fluid coupling to said support structure.

11. The fluid fitting defined in claim 9, which further includes a tube surrounding said internal fuel line and said reservoir and having a termination joined with said brim in fluid-tight relation, wherein said termination of said tube is fixedly attached to an underside of said brim, said underside facing away from said support structure.

12. The fluid fitting defined in claim 11, wherein said brim is formed having a plurality of angularly spaced boltholes in registry with correspondingly spaced boltholes in the support structure for receiving bolts inserted from the side of the support structure from which said second fluid line extends, at least one of said brim boltholes being threaded to engage a threaded end of a drain line communicating with the annular space between said tube and said reservoir and first fluid line.

13. A fuel fitting for completing a fluid coupling between internal and external fuel lines adjacent an opening in a casing surrounding a combustor of a gas turbine engine, said internal fuel line having a first end connected with an internal fuel manifold for the combustor, said fuel fitting comprising in combination:
   A. a first, threaded fluid joint half terminating a second end of said internal fuel line;
   B. a second, threaded fluid joint half terminating an end of said external fuel line for engaging said first fluid joint half to provide a threaded fluid coupling between said internal and external fuel lines; and
   C. a cup-shaped reservoir joined in fluid sealing relation with said first joint half to collect any fuel leakage from said fluid coupling, said reservoir having an outwardly turned annular brim serving as a mounting flange for affixture to the casing in surrounding relation with the opening therein;
   D. wherein said reservoir is integrally formed with said first half; and
   E. wherein said first joint half is in the form of a nipple having external threads, and said second joint half is in the form of a nipple seat, and a sleeve nut for engaging said nipple threads to clamp said nipple and nipple seat in fluid-tight engagement to perfect said fluid coupling.

14. The fluid fitting defined in claim 13, wherein said brim is formed having a plurality of angularly spaced boltholes in registry with correspondingly spaced boltholes in the support structure for receiving bolts inserted from the side of the support structure from which said second fluid line extends.

* * * * *